US012564967B2

(12) United States Patent
Kimura et al.

(10) Patent No.: US 12,564,967 B2
(45) Date of Patent: Mar. 3, 2026

(54) POSITION INSPECTION SYSTEM, COMPONENT ASSEMBLY SYSTEM, AND POSITION INSPECTION DEVICE

(71) Applicant: TOYOTA JIDOSHA KABUSHIKI KAISHA, Toyota (JP)

(72) Inventors: Akihiro Kimura, Toyota (JP); Hiroshi Bito, Toyota (JP); Fuminori Saito, Nagoya (JP); Reoto Uetake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 18/428,152

(22) Filed: Jan. 31, 2024

(65) Prior Publication Data

US 2024/0286291 A1      Aug. 29, 2024

(30) Foreign Application Priority Data

Feb. 27, 2023     (JP) ................................. 2023-028026

(51) Int. Cl.
| | |
|---|---|
| *B25J 9/16* | (2006.01) |
| *B25J 13/08* | (2006.01) |
| *B25J 15/06* | (2006.01) |

(52) U.S. Cl.
CPC ........... B25J 9/1697 (2013.01); B25J 9/1687 (2013.01); B25J 13/088 (2013.01); B25J 15/0616 (2013.01)

(58) Field of Classification Search
CPC ...... B25J 9/1697; B25J 9/1687; B25J 13/088; B25J 15/0616
See application file for complete search history.

(56) References Cited

U.S. PATENT DOCUMENTS

| | | | |
|---|---|---|---|
| 2017/0256046 A1* | 9/2017 | Watanabe | ............... G06F 18/22 |
| 2020/0016759 A1* | 1/2020 | Kim | ....................... B25J 9/1697 |
| 2020/0139545 A1* | 5/2020 | Hayashi | ................. B25J 9/1664 |
| 2020/0384654 A1* | 12/2020 | Bae | .......................... B25J 13/02 |
| 2021/0056659 A1 | 2/2021 | Ogura | |
| 2021/0396842 A1* | 12/2021 | Li | ......................... G01S 13/885 |

FOREIGN PATENT DOCUMENTS

| | | | |
|---|---|---|---|
| JP | 2021-033555 A | 3/2021 | |

* cited by examiner

*Primary Examiner* — Jay Khandpur
(74) *Attorney, Agent, or Firm* — Oliff PLC

(57) ABSTRACT

A position inspection system includes a gripping unit that grips an object, a shooting unit that shoots an inspection image of the object gripped by the gripping unit, and a processor. The processor identifies a first rotational amount of the object from the proper position within a plane of the inspection image. The processor identifies, based on control information of the gripping unit, a correction angle between a direction in which a particular portion of the object is facing and a shooting direction of the inspection image. The processor identifies, based on the first rotational amount and the correction angle, a second rotational amount of the object from the proper position about the direction in which the particular portion of the object is facing.

12 Claims, 4 Drawing Sheets

1

POSITION INSPECTION SYSTEM, COMPONENT ASSEMBLY SYSTEM, AND POSITION INSPECTION DEVICE

CROSS-REFERENCE TO RELATED APPLICATION

This application claims priority to Japanese Patent Application No. 2023-028026 filed on Feb. 27, 2023, incorporated herein by reference in its entirety.

BACKGROUND

1. Technical Field

The present disclosure relates to a position inspection system, a component assembly system, and a position inspection device.

2. Description of Related Art

Japanese Unexamined Patent Application Publication No. 2021-33555 (JP 2021-33555 A) describes an object detection device for detecting a target object represented in an image. The object detection device described in JP 2021-33555 A extracts a plurality of predetermined features from an image in which a target object is represented, and determines whether the target object is represented in a region in the image, based on the predetermined features that are extracted.

In recent years, with the development of artificial intelligence (AI) technology, there has been an increase in reports of technology for recognizing particular objects from images, as described in JP 2021-33555 A.

As a technology related to JP 2021-33555 A, there is a technology for shooting an inspection image of an object from a fixed point, and determining whether the object is disposed at a proper position, based on the position and shape of the object in this inspection image.

In this technology, an amount of positional deviation of the object in an up-down direction and a right-left direction can be detected, based on the position of the object in the plane of the inspection image.

Also, in this technology, an amount of positional deviation of the object in a depth-wise direction can be detected, based on the size of the object in the plane of the inspection image.

Also, in this technology, an amount of positional deviation due to rotation of the object about a rotation axis that is parallel to a direction of shooting the inspection image, i.e., a rotational amount, can be detected based on a rotational amount of the object in the plane of the inspection image.

However, in this technology, the rotational amount of the object about a rotation axis that is not parallel to the shooting direction of the inspection image cannot be detected. In other words, the positional deviation of the object cannot be detected sufficiently.

SUMMARY

The present disclosure provides a position inspection system, a component assembly system, a position inspection device, a position inspection method, and a component assembly method that can appropriately detect an amount of positional deviation of an object.

A position inspection system according to an aspect of the present disclosure includes:

a gripping unit configured to grip an object,
a shooting unit configured to shoot an inspection image of the object gripped by the gripping unit, and
a processor.
The processor is configured to
compare the inspection image shot by the shooting unit with a comparison image shot of the object gripped at a proper position,
identify a first rotational amount of the object from the proper position within a plane of the inspection image,
identify, based on control information of the gripping unit, a correction angle between a direction in which a particular portion of the object is facing and a shooting direction of the inspection image, and
identify, based on the first rotational amount and the correction angle, a second rotational amount of the object from the proper position about the direction in which the particular portion of the object is facing.

According to such a configuration, the position inspection system can identify the rotational amount of the object from the proper position about a rotation axis that is not parallel to the shooting direction of the inspection image.

As a result, the position inspection system can appropriately detect the amount of positional deviation of the object.

The object may include a planar portion. The direction in which the particular portion of the object is facing may be a normal line direction of the planar portion.

The gripping unit may include a suction unit configured to suction the planar portion, and a rotation shaft connected perpendicularly to a suction face of the suction unit.

The gripping unit may be configured to correct a position of the object, based on the second rotational amount.

The correction angle may not be 90 degrees.

The position inspection system may be configured to calculate the second rotational amount based on Expression $\theta_2=\theta_1/\cos\theta_3$, where $\theta_1$ is the first rotational amount, $\theta_2$ is the second rotational amount, and $\theta_3$ is the correction angle.

A component assembly system according to another aspect of the present disclosure includes:

a gripping unit configured to grip a component,
a shooting unit configured to shoot an inspection image of the component gripped by the gripping unit, and
a processor.
The processor is configured to
compare the inspection image shot by the shooting unit with a comparison image shot of the component gripped at a proper position,
identify a first rotational amount of the component from the proper position within a plane of the inspection image,
identify, based on control information of the gripping unit, a correction angle between a direction in which a particular portion of the component is facing and a shooting direction of the inspection image, and
identify, based on the first rotational amount and the correction angle, a second rotational amount of the component from the proper position about the direction in which the particular portion of the component is facing.
The gripping unit is configured to
correct a position of the component based on the second rotational amount, and
assemble the component to another component.
A position inspection device according to yet another aspect of the present disclosure includes a processor.

The processor is configured to compare an inspection image of an object with a comparison image shot of the object gripped at a proper position, identify a first rotational amount of the object from the proper position within a plane of the inspection image, identify a correction angle between a direction in which a particular portion of the object is facing and a shooting direction of the inspection image, and identify, based on the first rotational amount and the correction angle, a second rotational amount of the object from the proper position about the direction in which the particular portion of the object is facing.

A position inspection method according to still another aspect of the present disclosure includes:

comparing an inspection image of an object with a comparison image shot of the object gripped at a proper position, identifying a first rotational amount of the object from the proper position within a plane of the inspection image, identifying a correction angle between a direction in which a particular portion of the object is facing and a shooting direction of the inspection image, and identifying, based on the first rotational amount and the correction angle, a second rotational amount of the object from the proper position about the direction in which the particular portion of the object is facing.

A component assembly method according to a further aspect of the present disclosure includes:

gripping a component;

shooting an inspection image of the component that is gripped;

comparing the inspection image that is shot with a comparison image shot of the component gripped at a proper position;

identifying a first rotational amount of the component from the proper position within a plane of the inspection image;

identifying a correction angle between a direction in which a particular portion of the component is facing and a shooting direction of the inspection image;

identifying, based on the first rotational amount and the correction angle, a second rotational amount of the component from the proper position about the direction in which the particular portion of the component is facing;

correcting the position of the component based on the second rotational amount; and assembling the component to another component.

The present disclosure provides a position inspection system, a component assembly system, a position inspection device, a position inspection method, and a component assembly method that can appropriately detect an amount of positional deviation of an object.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Configuration of Component Assembly System

Figure 1:
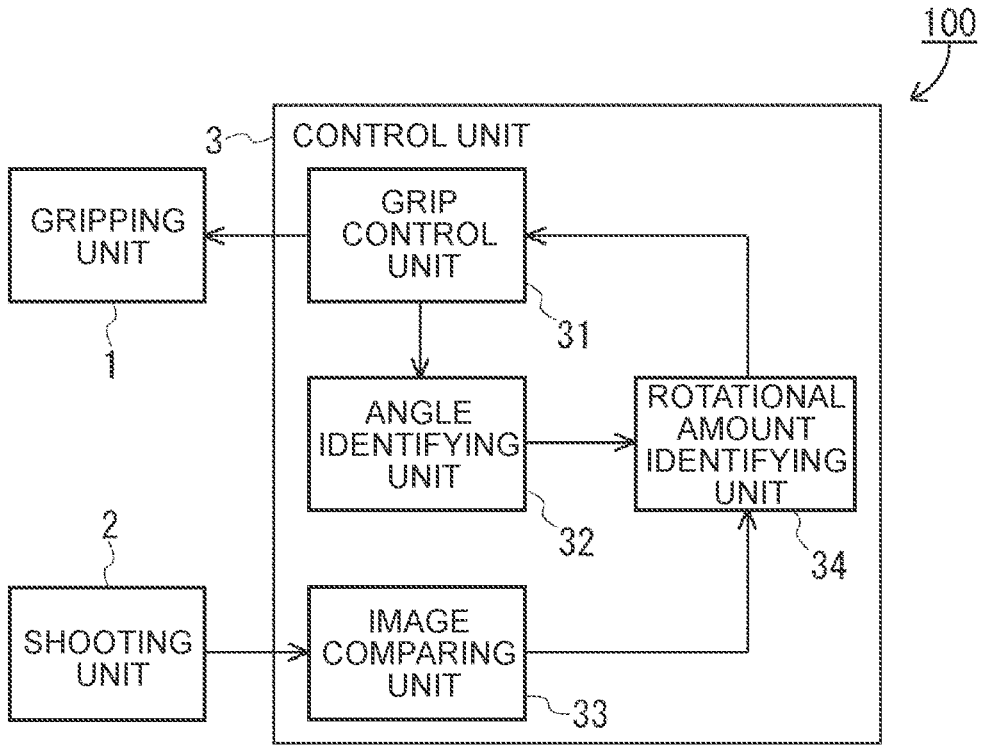
FIG. 1 is a block diagram illustrating a configuration of a component assembly system according to a first embodiment.

Hereinafter, a first embodiment according to the present disclosure will be described in detail with reference to the drawings. First, a configuration of a component assembly system according to the present embodiment will be described in detail. FIG. 1 is a block diagram illustrating the configuration of the component assembly system according to the first embodiment.

A component assembly system 100 according to the present embodiment manufactures products by assembling components to other components. The component assembly system 100 according to the present embodiment includes a gripping unit 1, a shooting unit 2, and a control unit 3.

More specifically, the component assembly system 100 according to the present embodiment grips a component and inspects positional deviation of the gripped component. The component assembly system 100 then corrects the position of the gripped component based on the detected positional deviation of the component, and assembles the component to another component.

Figure 2:
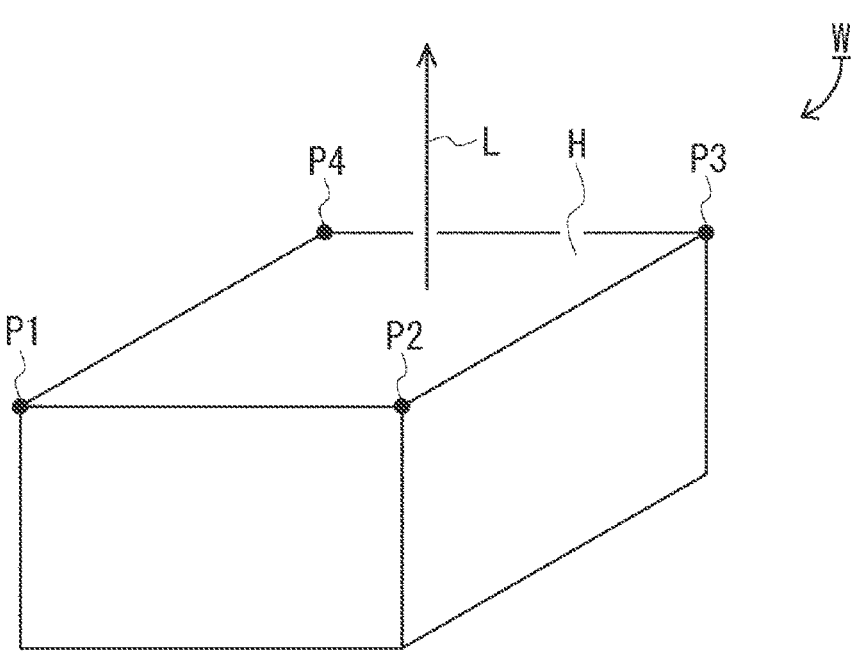
FIG. 2 is a schematic perspective view illustrating a shape of a component according to the first embodiment.

FIG. 2 is a schematic perspective view illustrating a shape of a component according to the first embodiment. More specifically, FIG. 2 is a schematic perspective view illustrating an example of the shape of a component gripped by the component assembly system 100.

A component W according to the present embodiment is an object regarding which the component assembly system 100 according to the present embodiment executes position inspection. The component assembly system 100 according to the present embodiment identifies, in particular, a rotational amount of the component W from a proper position thereof about a normal line direction L.

The component W according to the present embodiment is a component that has a cuboid form, as illustrated in FIG. 2. The component W has a planar portion H surrounded by points P1, P2, P3, and P4, with the normal line direction L to the planar portion H defined.

However, the shape of the component W according to the present embodiment is not limited to the shape illustrated in FIG. 2. The shape of the component W according to the present embodiment may be any shape as long as it is possible to define a particular portion and a direction in which the portion is facing.

For example, the component W may have a protruding portion as the particular portion, and may have a shape in which the direction in which the protruding portion faces is defined as a length direction of the protruding portion.

Figure 3:
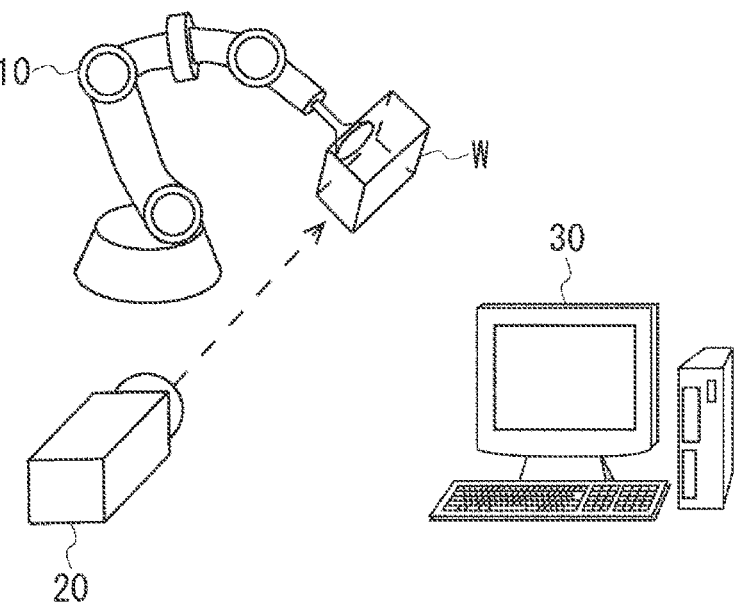
FIG. 3 is a schematic diagram illustrating a device configuration of the component assembly system according to the first embodiment.

FIG. 3 is a schematic diagram illustrating a device configuration of the component assembly system according to the first embodiment. The component assembly system 100 according to the present embodiment may include, for example, a robot arm 10, a camera 20, and a computer 30, as illustrated in FIG. 3.

The robot arm 10, the camera 20, and the computer 30 correspond to the above-described gripping unit 1, shooting unit 2, and control unit 3, respectively. The robot arm 10, the camera 20, and the computer 30 are connected by either of wired or wireless connection, or by both.

In the device configuration illustrated in FIG. 3, the robot arm 10 grips the component W, and the camera 20 and the computer 30 inspect the positional deviation of the gripped part, particularly the rotational amount from the proper position of the component W about the normal line direction L.

The robot arm 10 then corrects the position of the component W that is gripped, based on the positional deviation that is inspected, and assembles the component to another component.

However, the device configuration of the component assembly system 100 according to the present embodiment is not limited to that illustrated in FIG. 3. For example, the component assembly system 100 according to the present embodiment may be realized as a single device.

Returning to description of FIG. 1, the gripping unit 1 grips the component W.

More specifically, the gripping unit 1 according to the present embodiment grips the component W based on control from the control unit 3. The gripping unit 1 then corrects the position of the component W, which is gripped, to the proper position based on the control from the control unit 3, and performs assembly thereof to another component.

Figure 4:
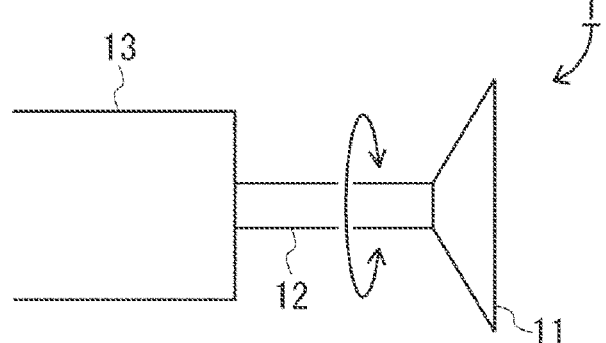
FIG. 4 is a schematic diagram illustrating a configuration of a gripping unit according to the first embodiment.

FIG. 4 is a schematic diagram illustrating a configuration of the gripping unit according to the first embodiment. The gripping unit 1 according to the present embodiment includes, for example, a suction unit 11, a rotation shaft 12, and a robot arm unit 13, as illustrated in FIG. 4. Note that only a portion of the robot arm unit 13 is illustrated.

The suction unit 11 is an end effector, and holds the component W by suction. The suction unit 11 suctions the planar portion H of the component W. The suction unit 11 is, for example, a suction cup that performs vacuum suctioning the component W or an electromagnet that magnetically performs attraction thereof. The suction unit 11 can be switched between suction holding and suction release based on control signals from the control unit 3 or the like. The suction unit 11 is connected to the rotation shaft 12 such that the rotation shaft 12 is perpendicular to a suction face of the suction unit 11.

Note that when the suction unit 11 is suctioning the planar portion H of the component W, the suction face of the suction unit 11 and the planar portion H are parallel.

The suction unit 11 is configured to rotate as the rotation shaft 12 rotates. When the suction unit 11 rotates with the rotation of the rotation shaft 12, the component W that the suction unit 11 suctions also rotates accordingly.

The rotation shaft 12 is a shaft connected perpendicularly to the suction face of the suction unit 11, and connects the suction unit 11 and the robot arm unit 13.

The rotation shaft 12 is connected to a rotation mechanism included in the robot arm unit 13, and is configured to rotate together with the suction unit 11.

Note that when the suction unit 11 is suctioning the planar portion H of the component W, the rotation shaft 12 and the planar portion H are perpendicular to each other. That is to say, when the suction unit 11 is suctioning the planar portion H of the component W, a length direction (axial direction) of the rotation shaft 12 and the normal line direction L of the planar portion H coincide with each other.

The robot arm unit 13 is a robot arm that bends and stretches joints thereof based on the control from the control unit 3, and adjusts the positions of the suction unit 11 and the rotation shaft 12. The robot arm unit 13 is, for example, an arm mechanism having seven degrees of freedom. The suction unit 11 is connected to a distal end of the robot arm unit 13 via the rotation shaft 12. More specifically, the robot arm unit 13 according to the present embodiment adjusts the positions of the suction unit 11 and the rotation shaft 12 in an up-down direction, a right-left direction, and a depth-wise direction, and the longitudinal direction of the rotation shaft 12 adjusts the orientation.

The robot arm unit 13 has the rotation mechanism, and is configured to be able to rotate the suction unit 11 and the rotation shaft 12 about the length direction of the rotation shaft 12.

As described above, when the suction unit 11 is suctioning the planar portion H of the component W, the suction face of the suction unit 11 and the planar portion H are parallel to each other, and the longitudinal direction of the rotation shaft 12 and the normal line direction L of the planar portion H coincide with each other. Accordingly, the robot arm unit 13 can adjust the position and orientation of the component W by adjusting the positions of the suction unit 11 and the rotation shaft 12.

That is to say, the gripping unit 1 according to the present embodiment is configured so that the direction in which the planar portion H, i.e., a particular portion of the component W faces, can be adjusted. In other words, the control information for the gripping unit 1 includes information corresponding to two rotational degrees of freedom among three rotational degrees of freedom that determine the orientation of the component W.

Returning to description of FIG. 1, the shooting unit 2 shoots an inspection image of the component W gripped by the gripping unit 1.

The shooting unit 2 outputs the inspection image that has been shot to the control unit 3.

Note that the shooting direction of the shooting unit 2 is set so as not to be perpendicular to the direction in which the particular portion of the component W faces. According to such a configuration, the rotational amount of the component W from the proper position about the normal line direction L can be appropriately identified. Note that the shooting direction of the shooting unit 2 can be defined as a direction that coincides with an optical axis of a lens of the camera 20. Accordingly, the camera 20 shoots the planar portion H, which is the suctioned face of the component W, from an oblique direction.

The control unit 3 controls operations of the component assembly system 100.

In particular, the control unit 3 identifies the rotational amount of the component W from the proper position about the normal line direction L, based on the control information of the gripping unit 1 and the inspection image shot by the shooting unit 2. The position of the component W is then corrected, based on the rotational amount that is identified.

The control unit 3 includes a grip control unit 31, an angle identifying unit 32, an image comparing unit 33, and a rotational amount identifying unit 34.

Figure 5:
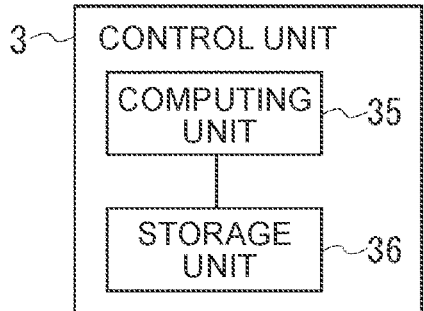
FIG. 5 is a block diagram illustrating a configuration of a control unit 3 according to the first embodiment.

FIG. 5 is a block diagram illustrating a configuration of the control unit 3 according to the first embodiment.

The control unit 3 includes a computing unit 35 such as a central processing unit (CPU) illustrated in FIG. 4, and a storage unit 36 such as random-access memory (RAM), read-only memory (ROM), and so forth, storing programs, data, and so forth, for controlling the component assembly system 100. That is to say, the control unit 3 has a function as a computer, and controls the component assembly system 100 based on the above programs.

Accordingly, each functional block making up the control unit 3 illustrated in FIG. 1 can be made up of the above-described CPU, storage unit, other circuits, and so forth, in terms of hardware. In terms of software, each functional block can be realized by a program or the like, stored in a storage unit, for controlling the component assembly system 100. That is to say, the control unit 3 can be realized in various forms by hardware, software, or a combination of both.

Note that the program includes a set of instructions (or software code) for causing the computer to perform one or more of the functions described in the embodiments when loaded into the computer. The program may be stored in a non-transitory computer-readable medium or a tangible storage medium. Examples of the computer-readable medium or the tangible storage medium include, but are not limited to, RAM, ROM, flash memory, a solid-state drive (SSD) or other memory technologies, a compact disc read-only memory (CD-ROM), a digital versatile disc (DVD), a Blu-ray (registered trademark) disc or other optical disc storages, a magnetic cassette, magnetic tape, magnetic disc storage, or other magnetic storage devices. The program may be transmitted on a transitory computer-readable medium or a communication medium. Examples of the transitory computer-readable medium or the communication medium include, but are not limited to, an electrical, optical, acoustic, or other forms of propagating signals.

Returning to description of FIG. 1, the grip control unit 31 controls the operations of the gripping unit 1.

More specifically, the grip control unit 31 controls the gripping unit 1 so as to grip the component W. The grip control unit 31 then controls the gripping unit 1 to move the component W to a predetermined position, i.e., to the shooting position of the inspection image.

The grip control unit 31 outputs control information for the gripping unit 1 to the angle identifying unit 32.

Note that the control information of the gripping unit 1 referred to here is information such as the degree of bending of the joints of the robot arm unit 13 and so forth, and is control information used to adjust the positions of the component W, the suction unit 11, and the rotation shaft 12. As described above, the control information of the gripping unit 1 substantially includes position information of the suction unit 11 and the rotation shaft 12.

The grip control unit 31 acquires a second rotational amount, which will be described later, from the rotational amount identifying unit 34, i.e., the rotational amount of the component W from the proper position about the direction in which the particular portion of the component W is facing.

The grip control unit 31 controls the gripping unit 1 based on the second rotational amount that is acquired, to correct the position of the component W that is gripped.

The angle identifying unit 32 acquires control information for the gripping unit 1 from the grip control unit 31.

The angle identifying unit 32 identifies, based on the control information of the gripping unit 1, the angle formed by the direction in which the particular portion of the component W is facing and the shooting direction of the inspection image, as a correction angle. That is to say, the angle identifying unit 32 identifies the angle formed by the normal line direction L and the shooting direction of the inspection image as the correction angle.

More specifically, the angle identifying unit 32 according to the present embodiment identifies the normal line direction of the suction face of the suction unit 11, in other words, the length direction of the rotation shaft 12, based on the control information of the gripping unit 1.

As described above, the suction face of the suction unit 11 is perpendicular to the normal line direction L, and the rotation shaft 12 is parallel to the normal line direction L. Accordingly, the direction identified based on the control information of the gripping unit 1 coincides with the normal line direction L.

That is to say, the angle identifying unit 32 according to the present embodiment identifies the direction of the normal line direction L by identifying the length direction of the rotation shaft 12, based on the control information of the gripping unit 1. Also, the angle formed by the normal line direction L that is identified and the shooting direction of the inspection image is identified as the correction angle.

The angle identifying unit 32 outputs the correction angle that is identified to the rotational amount identifying unit 34.

The image comparing unit 33 acquires an inspection image of the component W from the shooting unit 2.

The image comparing unit 33 compares the inspection image shot by the shooting unit 2 with a comparison image shot of the component W being gripped at the proper position. The image comparing unit 33 identifies the rotational amount of the component W from the proper position within a plane of the inspection image, as a first rotational amount.

The image comparing unit 33 outputs the identified first rotational amount that is identified, to the rotational amount identifying unit 34.

The image comparing unit 33 may recognize the component W in the inspection image and the comparison image using, for example, artificial intelligence (AI). Also, the image comparing unit 33 may recognize the particular portion of the component W in the inspection image and the comparison image using, for example, artificial intelligence (AI).

Note that the image comparing unit 33 may compare the inspection image shot by the shooting unit 2 with a comparison image shot of the component W gripped at the proper position, and may identify positional deviation amount of the component W in the up-down direction, the right-left direction, and the depth-wise direction.

For example, the image comparing unit 33 may identify the positional deviation amount of the component W in the up-down direction and the right-left direction by comparing the position of the component W in the inspection image and the position of the component W in the comparison image.

Also, the image comparing unit 33 may identify the positional deviation amount of the component W in the depth-wise direction by comparing the size of the component W in the inspection image and the size of the component W in the comparison image, for example.

The rotational amount identifying unit 34 acquires the correction angle from the angle identifying unit 32. The rotational amount identifying unit 34 acquires the first rotational amount from the image comparing unit 33.

Based on the first rotational amount and the correction angle that are acquired, the rotational amount identifying unit 34 identifies the rotational amount from the proper position of the component W about the direction in which the particular portion of the component W is facing, as the second rotational amount. That is to say, the rotational amount identifying unit 34 identifies the rotational amount from the proper position of the component W about the normal line direction L, based on the first rotational amount and the correction angle that are acquired.

The rotational amount identifying unit 34 outputs the second rotational amount that is identified, to the grip control unit 31.

The rotational amount identifying unit 34 calculates the second rotational amount, based on, for example, Expression $\theta_2 = \theta_1/\cos\theta_3$, where $\theta_1$ is the first rotational amount, $\theta_2$ is the second rotational amount, and $\theta_3$ is the correction angle.

Operations of Component Assembly System

Figure 6:
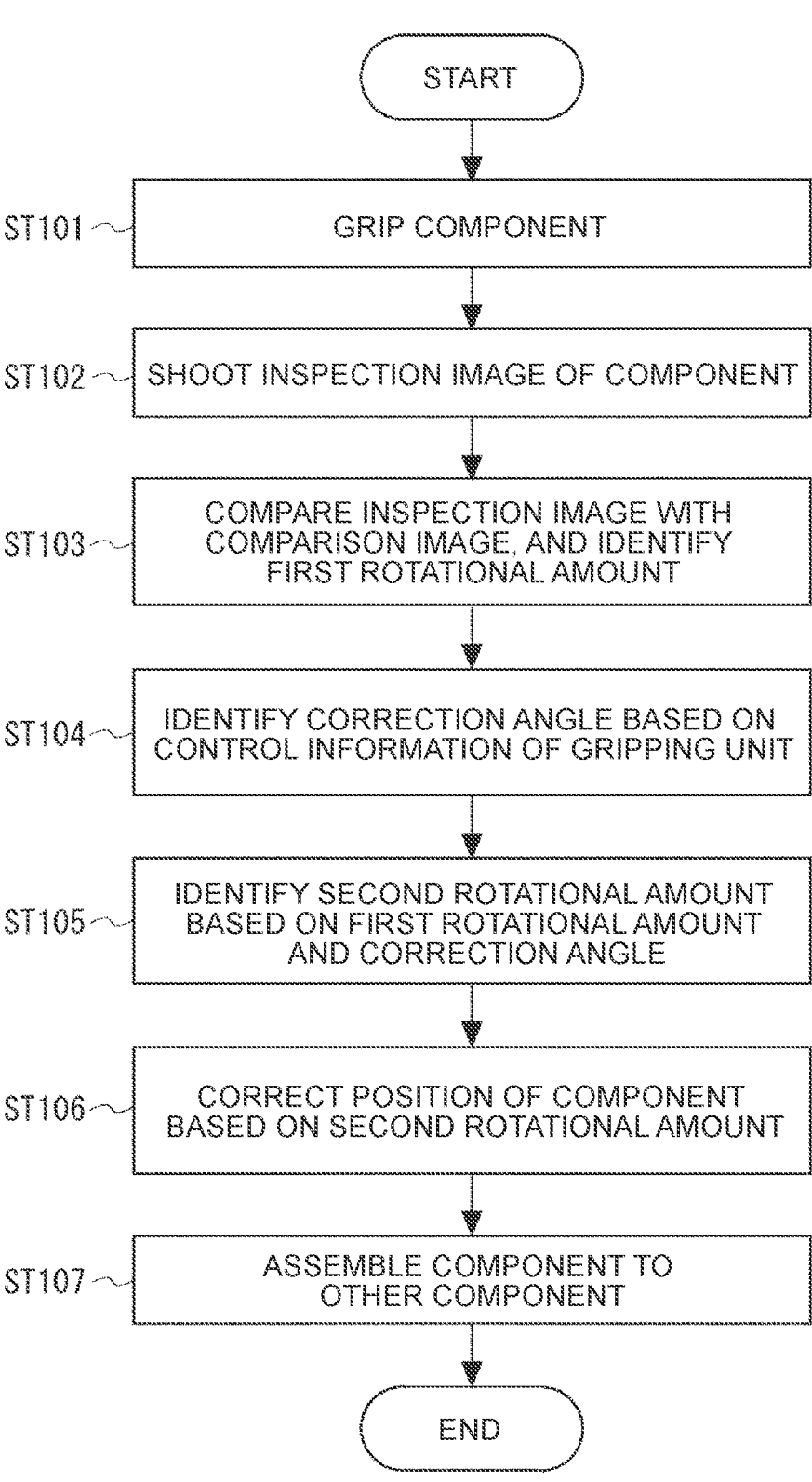
FIG. 6 is a flowchart for describing operations of the component assembly system according to the first embodiment.

Next, operations of the component assembly system, i.e., the component assembly method according to the first embodiment, will be described in detail. FIG. 6 is a flowchart for describing operations of the component assembly system according to the first embodiment.

First, the gripping unit 1 grips the component W (step ST101).

Next, the shooting unit 2 shoots an inspection image of the component W (step ST102). The inspection image shot by the shooting unit 2 is output to the control unit 3.

Next, the image comparing unit 33 compares the inspection image and a comparison image and identifies a first rotational amount (step ST103).

Next, the angle identifying unit 32 identifies a correction angle, based on control information of the gripping unit 1 (step ST104). More specifically, the angle identifying unit 32 identifies the correction angle based on the control information of the gripping unit 1 at the timing of the inspection image being shot.

Note that step ST103 and step ST104 may be executed in reverse order, or may be executed in parallel.

Next, the rotational amount identifying unit 34 identifies a second rotational amount based on the first rotational amount and the correction angle (step ST105).

Next, the gripping unit 1 corrects the position of the component, based on the second rotational amount (step ST106). Finally, the gripping unit 1 assembles the component to another component (step ST107), and the component assembly system 100 ends the series of operations.

As described above, the component assembly system 100 according to the present embodiment identifies the direction in which a particular portion of the component W is facing, based on the control information of the gripping unit 1.

The component assembly system 100 according to the present embodiment identifies the rotational amount of the component W from the proper position about the direction in which the particular portion is facing, based on the direction in which the particular portion of the component W is facing, the shooting direction of the inspection image, and the rotational amount of the component W from the proper position within the plane of the inspection image.

According to such a configuration, the rotational amount of the component W can be identified from the proper position about a rotation axis that is not parallel to the shooting direction of the inspection image.

As a result, the component assembly system 100 according to the present embodiment can appropriately detect deviation in the position of the component W that is gripped, and can correct the position of the component to the proper position.

Other Embodiments

The component assembly system 100 according to the first embodiment corrects the position of the component (step ST106), and assembles the component W to another component without inspecting the position of the component following correction (step ST107). However, the component assembly system 100 according to the present disclosure may assemble the component W to the other component after inspecting the position of the component following correction.

Figure 7:
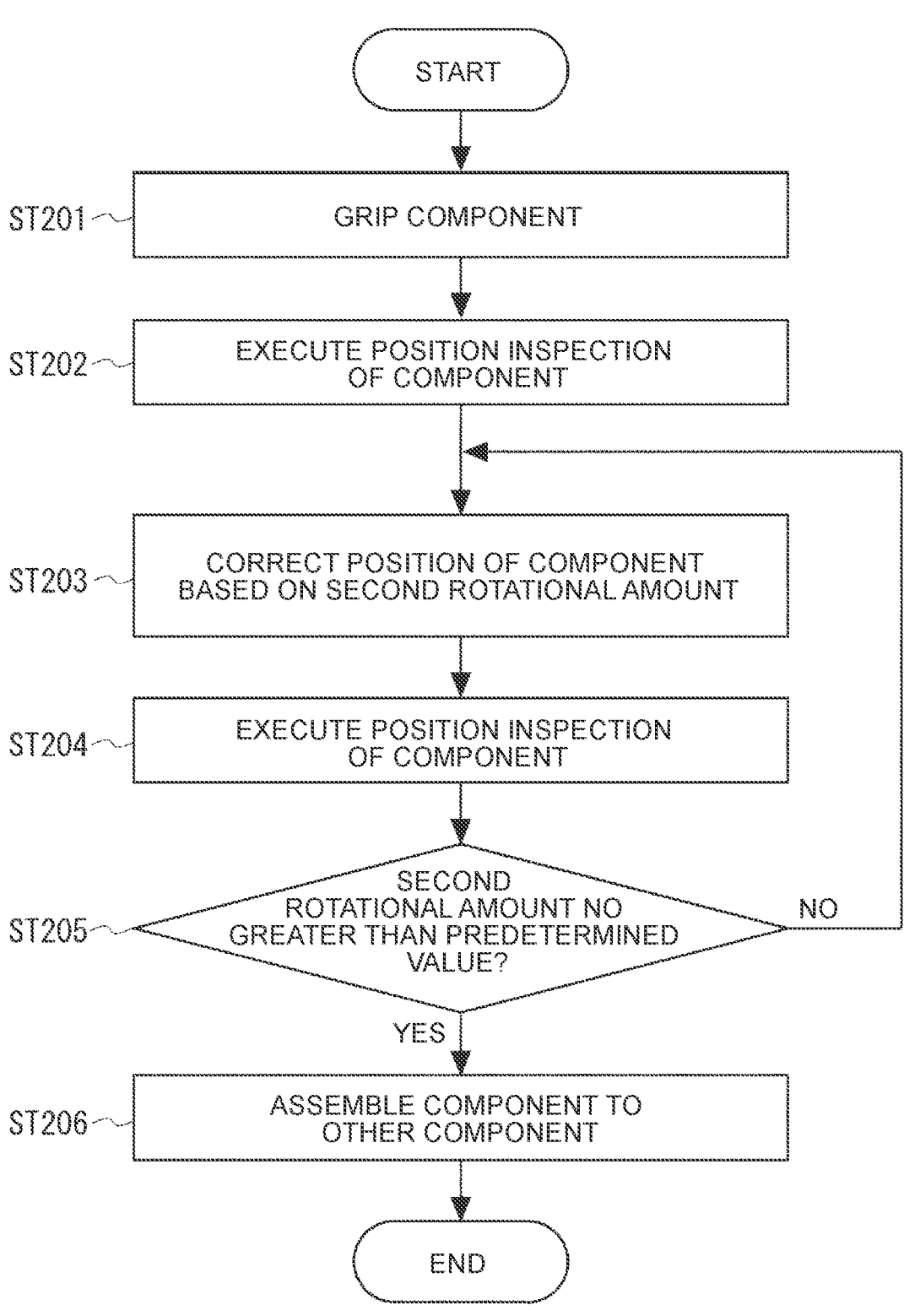
FIG. 7 is a flowchart for describing operations of a component assembly system according to another embodiment.

FIG. 7 is a flowchart for describing operations of a component assembly system according to another embodiment. More specifically, FIG. 7 is a flowchart showing the operations of the component assembly system 100 when the position of the component W following correction is to be inspected.

In the operations shown in the flowchart in FIG. 7, first, the gripping unit 1 grips the component W (step ST201). Next, the shooting unit 2 and the control unit 3 execute position inspection of the component W (step ST202).

Note that the position inspection of the component W here refers to the series of operations from step ST102 to step ST105 out of the operations listed in the flowchart shown in FIG. 6. That is to say, in step ST202, the series of operations from step ST102 to step ST105 is executed.

Next, the gripping unit 1 corrects the position of the component, based on a second rotational amount (step ST203). Next, the shooting unit 2 and the control unit 3 execute position inspection of the component W (step ST204).

That is to say, in the operations shown in the flowchart in FIG. 7, after the gripping unit 1 corrects the position of the component, the operation executed in step ST202 is executed again.

Next, the grip control unit 31 determines whether the second rotational amount is no greater than a predetermined value (step ST205). More specifically, the grip control unit 31 determines whether the second rotational amount identified in step ST204 is no greater than the predetermined value.

When the second rotational amount no greater than the predetermined value (Yes in step ST205), the gripping unit 1 assembles the component to another component (step ST206), and the component assembly system 100 ends the series of operations.

When the second rotational amount is not no greater than the predetermined value (No in step ST205), the series of operations from step ST203 to step ST205 is executed again. That is to say, in the operations shown in the flowchart in FIG. 7, the series of operations from step ST203 to step ST205 is repeated until the second rotational amount becomes no greater than the predetermined value.

According to such a configuration, the component assembly system 100 can assemble the component W to another component after correcting the position of the component W more appropriately.

Although the operation of the gripping unit 1 according to the first embodiment is controlled by the control unit 3, the configuration of the gripping unit according to the present disclosure is not limited to this.

For example, the gripping unit 1 according to the present disclosure may have a control mechanism that controls the operations of itself, and may operate based on control by this control mechanism.

In this case, the gripping unit 1 outputs control information to the control unit 3. The second rotational amount is then acquired from the control unit 3, and the position of the component W is corrected based on the second rotational amount that is acquired.

Also, in this case, the control unit 3 does not need to include the grip control unit 31, and only needs to include at least the angle identifying unit 32, the image comparing unit 33, and the rotational amount identifying unit 34. In this case, the control unit 3 may be referred to as a "position inspection device", for example.

Although the component assembly system 100 according to the first embodiment inspects the position of the gripped component, and thereafter performs assembly thereof to another component, the system according to the present disclosure is not limited to such a configuration.

For example, the system according to the present disclosure may just identify the second rotational amount of the gripped object. That is to say, the system according to the present disclosure may have a configuration in which the step of correcting the position of the object based on the second rotational amount, and the step of assembling the object to another component, are not executed.

In this case, the system according to the present disclosure may be referred to as a "position inspection system", for example.

The present disclosure has thus been described by way of the above embodiments, but the present disclosure is not limited to the configurations of the above embodiments alone, and includes various modifications, alterations, and combinations that could be made by those skilled in the art, within the scope of the claims of the present application.

What is claimed is:

1. A position inspection system, comprising:
a robot arm configured to grip an object;
a camera configured to shoot an inspection image of the object gripped by the robot arm; and
a processor,
wherein the processor is configured to
compare the inspection image shot by the camera with a comparison image shot of the object gripped at a proper position,
identify a first rotational amount of the object from the proper position within a plane of the inspection image,
identify, based on control information of the robot arm, a correction angle between a direction in which a particular portion of the object is facing and a shooting direction of the inspection image, and
identify, based on the first rotational amount and the correction angle, a second rotational amount of the object from the proper position about the direction in which the particular portion of the object is facing, wherein
the processor is configured to calculate the second rotational amount based on Expression $\theta_2 = \theta_1/\cos \theta_3$,
where $\theta_1$ is the first rotational amount, $\theta_2$ is the second rotational amount, and $\theta_3$ is the correction angle.

2. The position inspection system according to claim 1, wherein
the object includes a planar portion, and
the direction in which the particular portion of the object is facing is a normal line direction of the planar portion.

3. The position inspection system according to claim 2, wherein the robot arm includes:
an end effector configured to hold the planar portion by suction or magnetism; and
a rotation shaft connected perpendicularly to a face of the end effector.

4. The position inspection system according to claim 1, wherein the robot arm is configured to correct a position of the object, based on the second rotational amount.

5. The position inspection system according to claim 1, wherein the correction angle is not 90 degrees.

6. A component assembly system, comprising:
a robot arm configured to grip a component;
a camera configured to shoot an inspection image of the component gripped by the robot arm; and
a processor, wherein:
the processor is configured to
compare the inspection image shot by the camera with a comparison image shot of the component gripped at a proper position,
identify a first rotational amount of the component from the proper position within a plane of the inspection image,
identify, based on control information of the robot arm, a correction angle between a direction in which a particular portion of the component is facing and a shooting direction of the inspection image, and
identify, based on the first rotational amount and the correction angle, a second rotational amount of the component from the proper position about the direction in which the particular portion of the component is facing; and
the robot arm is configured to
correct a position of the component based on the second rotational amount, and assemble the component to another component, wherein
the processor is configured to calculate the second rotational amount based on Expression $\theta_2 = \theta_1/\cos \theta_3$,
where $\theta_1$ is the first rotational amount, $\theta_2$ is the second rotational amount, and $\theta_3$ is the correction angle.

7. The component assembly system according to claim 6, wherein
the component includes a planar portion, and
the direction in which the particular portion of the component is facing is a normal line direction of the planar portion.

8. The component assembly system according to claim 7, wherein the robot arm includes:
an end effector configured to hold the planar portion by suction or magnetism; and
a rotation shaft connected perpendicularly to a face of the end effector.

9. The component assembly system according to claim 6, wherein the correction angle is not 90 degrees.

10. A position inspection device, comprising a processor configured to:
compare an inspection image of an object with a comparison image shot of the object gripped at a proper position;
identify a first rotational amount of the object from the proper position within a plane of the inspection image;
identify a correction angle between a direction in which a particular portion of the object is facing and a shooting direction of the inspection image; and
identify, based on the first rotational amount and the correction angle, a second rotational amount of the object from the proper position about the direction in which the particular portion of the object is facing, wherein the processor is configured to calculate the second rotational amount based on Expression $\theta_2 = \theta_1/\cos \theta_3$,
where $\theta_1$ is the first rotational amount, $\theta_2$ is the second rotational amount, and $\theta_3$ is the correction angle.

11. The position inspection device according to claim 10, wherein
the object includes a planar portion, and
the direction in which the particular portion of the object is facing is a normal line direction of the planar portion.

12. The position inspection device according to claim 10, wherein the correction angle is not 90 degrees.

\* \* \* \* \*